United States Patent
Shi (10) Patent No.: US 10,460,689 B2
(45) Date of Patent: Oct. 29, 2019

(54) GATE DRIVING CIRCUIT

(71) Applicant: Shenzhen China Star Optoelectronics Technology Co., Ltd., Shenzhen (CN)

(72) Inventor: Longqiang Shi, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/327,315

(22) PCT Filed: Dec. 20, 2016

(86) PCT No.: PCT/CN2016/110942
§ 371 (c)(1),
(2) Date: Aug. 3, 2018

(87) PCT Pub. No.: WO2018/040388
PCT Pub. Date: Mar. 8, 2018

(65) Prior Publication Data
US 2019/0156775 A1     May 23, 2019

(30) Foreign Application Priority Data
Aug. 31, 2016   (CN) .......................... 2016 1 0795952

(51) Int. Cl.
*G09G 3/36*     (2006.01)
*G02F 1/1368*   (2006.01)

(52) U.S. Cl.
CPC ......... *G09G 3/3677* (2013.01); *G02F 1/1368* (2013.01); *G09G 2300/0408* (2013.01);
(Continued)

(58) Field of Classification Search
CPC .............. G09G 3/3677; G09G 3/3266; G09G 2310/0286; G09G 2310/0267; G11C 27/04
See application file for complete search history.

(56) References Cited

U.S. PATENT DOCUMENTS

2008/0186058 A1   8/2008   Chen et al.
2010/0207928 A1   8/2010   Lee et al.
(Continued)

FOREIGN PATENT DOCUMENTS

CN   101604551 A   12/2009
CN   103219047 A    7/2013
(Continued)

OTHER PUBLICATIONS

Chinese Office Action for related Chinese Application No. 201610795952.6; action dated Feb. 16, 2018; (7 pages).
(Continued)

*Primary Examiner* — Yuzhen Shen (57) ABSTRACT

Disclosed is a gate driving circuit, which includes multi-stages of gate driving units. Each stage of gate driving unit includes an input control module, an output control module, a pull-down module, a pull-down maintenance module, and a compensation module. Since the compensation module is provided, a threshold voltage of a transistor will not influence an electric potential of a first node. Hence, a stability of the gate driving circuit can be greatly improved, and a display effect of a liquid crystal display panel can be improved.

20 Claims, 5 Drawing Sheets

(52) U.S. Cl.
CPC ............... *G09G 2300/0426* (2013.01); *G09G 2300/0809* (2013.01); *G09G 2310/0264* (2013.01); *G09G 2310/08* (2013.01)

(56) References Cited

U.S. PATENT DOCUMENTS

| | | | | |
|---|---|---|---|---|
| 2015/0187312 | A1* | 7/2015 | Dai | G09G 3/3648 345/213 |
| 2015/0279288 | A1* | 10/2015 | Dai | G02F 1/13306 345/690 |
| 2016/0125830 | A1* | 5/2016 | Xiao | G09G 3/3677 345/92 |
| 2016/0140922 | A1* | 5/2016 | Dai | G11C 19/287 |
| 2016/0260403 | A1* | 9/2016 | Dai | G09G 3/36 |
| 2016/0284304 | A1* | 9/2016 | Dai | G09G 3/36 |
| 2016/0307531 | A1* | 10/2016 | Xiao | G09G 3/3677 |
| 2016/0343321 | A1* | 11/2016 | Xiao | G09G 3/3648 |
| 2017/0148403 | A1* | 5/2017 | Dai | G02F 1/1368 |

FOREIGN PATENT DOCUMENTS

| | | | | | |
|---|---|---|---|---|---|
| CN | 103680453 | A | * | 3/2014 | ......... G02F 1/13306 |
| CN | 103730094 | A | * | 4/2014 | ........... G09G 3/3648 |
| CN | 104008741 | A | * | 8/2014 | ............... G09G 3/36 |
| CN | 104064158 | A | * | 9/2014 | ............... G09G 3/36 |
| CN | 104064158 | A | | 9/2014 | |
| CN | 104064159 | A | | 9/2014 | |
| CN | 104376824 | A | * | 2/2015 | ........... G11C 19/287 |
| CN | 104464657 | A | | 3/2015 | |
| CN | 104464657 | A | * | 3/2015 | ........... G09G 3/3648 |
| CN | 104464660 | A | * | 3/2015 | ............... G09G 3/36 |
| CN | 104766575 | A | * | 7/2015 | ........... G09G 3/3677 |
| CN | 104766584 | A | * | 7/2015 | ........... G02F 1/1368 |
| CN | 104992682 | A | | 10/2015 | |
| CN | 106157914 | A | | 11/2016 | |
| EP | 1445862 | A2 | | 8/2004 | |
| TW | 201015511 | A | | 4/2010 | |

OTHER PUBLICATIONS

International Search Report and Written Opinion for related International Application No. PCT/CN2016/110942; report dated Jun. 2, 2017; (14 pages).

\* cited by examiner

Fig. 1

Prior Art

GATE DRIVING CIRCUIT

This application claims the priority of Chinese patent application CN 201610795952.6, entitled "Gate driving circuit" and filed on Aug. 31, 2016, the entirety of which is incorporated herein by reference.

FIELD OF THE INVENTION

The present disclosure relates to the technical field of display, and in particular, to a gate driving circuit.

BACKGROUND OF THE INVENTION

In GOA (Gate Drive On Array) technology, a gate driver is manufactured on a thin film transistor array substrate, via a manufacturing procedure of a thin film transistor (TFT) array, so as to achieve row-by-row scanning.

The GOA technology is widely applied and researched due to its benefit for the narrow frame design on a gate driving side of a display screen and reduction of cost.

With development of the oxide semiconductor thin film transistor (for example, IGZO, indium gallium zinc oxide thin film transistor), the corresponding integrated circuits surrounding the panel of the oxide semiconductor have become research focus. Since a carrier mobility ratio of the oxide semiconductor thin film transistor is 20-30 times that of an amorphous silicon thin film transistor, a charge-discharge rate of the thin film transistor on a pixel electrode can be greatly improved. It can be seen that, the oxide semiconductor thin film transistor can improve a response speed of a pixel and obtain a faster refresh rate so as to greatly improve a row scanning rate of the pixel and thus achieve an ultrahigh resolution in TFT-LCD. The GOA circuit of the oxide semiconductor thin film transistor may replace the GOA circuit of the amorphous silicon in the future.

However, in the prior art, the development of GOA circuit of the oxide semiconductor thin film transistor is few since there are many problems brought about by an electric property per se of the oxide semiconductor thin film transistor to be overcome. Specifically, IGZO belongs to an N type semiconductor and the hole number thereof is small. Hence, IGZO-TFT usually shows an excellent negative bias stress (NBTS) property. However, a positive bias stress property of IGZO-TFT is not good enough. The prolonged positive bias stress will result in forward drift of a threshold voltage (Vth) of TFT and thus a turning-on speed of IGZO-TFT device becomes slow, which seriously influences the GOA circuit.

SUMMARY OF THE INVENTION

The technical problem to be solved by the present disclosure is as follows. In the prior art, a positive bias stress property of IGZO-TFT is not good enough. The prolonged positive bias stress will result in forward drift of a threshold voltage (Vth) of TFT and thus a turning-on speed of IGZO-TFT device becomes slow, which seriously influences the GOA circuit.

In order to solve the above technical problem, the present disclosure provides a gate driving circuit.

The technical solution of the present invention will be described as follows.

The gate driving circuit comprises multi-stages of gate driving units in series connection with one another. Each stage of gate driving unit is configured to output a scanning signal through an output end thereof according to a scanning signal output by a previous stage of gate driving unit, a scanning signal output by a next stage of gate driving unit, and a clock signal.

Each stage of gate driving unit comprises:

an input control module, configured to be controlled by the scanning signal output by the previous stage of gate driving unit so as to control an electric potential of a first node;

an output control module, connected to the first node, and configured to control an electric potential of an output end of a present stage of gate driving unit according to the electric potential of the first node;

a pull-down module, connected to the output control module, and configured to pull down the electric potential of the output end of the present stage of gate driving unit according to an electric potential of a second node;

a pull-down maintenance module, connected to the pull-down module, and configured to maintain the electric potential of the second node during a non-scanning period so that the electric potential of the output end of the present stage of gate driving unit is maintained in a negative electric potential; and a compensation module, connected to the pull-down maintenance module and the first node, and configured to keep the electric potential of the first node in a negative electric potential during the non-scanning period.

Preferably, the pull-down maintenance module comprises:

a fifty-first transistor, with a gate and a drain thereof both being connected to a constant high voltage output end, and a source thereof being connected to a fourth node;

a fifty-second transistor, with a gate thereof being connected to the first node, a drain thereof being connected to the fourth node, and a source thereof being connected to a first negative electric potential output end;

a fifty-third transistor, with a gate thereof being connected to the fourth node, a drain thereof being connected to the constant high voltage output end, and a source thereof being connected to the second node;

a fifty-fourth transistor, with a gate thereof being connected to the first node, a drain thereof being connected to the second node, and a source thereof being connected to a third node;

a seventy-third transistor, with a gate thereof being connected to the fourth node, a drain thereof being connected to the constant high voltage output end, and a source thereof being connected to the third node;

a seventy-fourth transistor, with a gate thereof being connected to the first node, a drain thereof being connected to the third node, and a source thereof being connected to a constant low voltage output end;

an eighty-first transistor, with a gate thereof being connected to the first node, a drain thereof being connected to the constant high voltage output end, and a source thereof being connected to a fifth node;

an eighty-second transistor, with a gate thereof being connected to the second node, a drain thereof being connected to the constant low voltage output end, and a source thereof being connected to the fifth node;

a forty-second transistor, with a gate thereof being connected to the compensation module, a drain thereof being connected to the first node, and a source thereof being connected to the fifth node; and a thirty-second transistor, with a gate thereof being connected to the second node, a drain thereof being connected to the output end of the present stage of gate driving unit, and a source thereof being connected to the first negative electric potential output end, wherein an electric potential of the constant low voltage output end is lower than an electric potential of the first negative electric potential output end.

Preferably, an electric potential of the constant high voltage output end is in a range from 20 to 30V. The electric potential of the constant low voltage output end and the electric potential of the first negative electric potential output end are both in a range from −5 to −8V.

Preferably, the compensation module comprises:

a first transistor, with a gate thereof being connected to the output end of the present stage of gate driving unit, a drain thereof being connected to an output end of a positive electric potential, and a source thereof being connected to the gate of the forty-second transistor;

a second transistor, with a gate thereof being connected to the second node, a drain thereof being connected to the gate of the forty-second transistor, and a source thereof being connected to the sixth node;

a third transistor, with a gate and a source thereof being connected to the output end of the present stage of gate driving unit, and a drain thereof being connected to the sixth node;

a storage capacitor; and a fourth transistor, with a gate thereof being connected to the second node, a drain thereof being connected to the sixth node through the storage capacitor, and a source thereof being connected to a second negative electric potential output end, wherein the electric potential of the constant low voltage output end, the electric potential of the first negative electric potential output end, and an electric potential of the second negative electric potential output end increase in sequence; and wherein the electric potential of the constant high voltage output end is higher than an electric potential of the positive electric potential output end.

Preferably, the electric potential of the positive electric potential output end is in a range from 2 to 5V.

Preferably, the input control module comprises an eleventh transistor. A gate of the eleventh transistor is connected to a constant high voltage output end, a drain thereof is connected to the output end of the previous stage of gate driving unit, and a source thereof is connected to the first node.

Preferably, the output control module comprises:

a twenty-first transistor, with a gate thereof being connected to the first node, a drain thereof being connected to an output end of the clock signal, and a source thereof being connected to the output end of the present stage of gate driving unit;

a twenty-second transistor, with a gate thereof being connected to the first node, a drain thereof being connected to the output end of the clock signal, and a source thereof being connected to a driving output end of the present stage of gate driving unit; and a bootstrap capacitor, wherein the first node is connected to the output end of the present stage of gate driving unit through the bootstrap capacitor.

Preferably, the pull-down module comprises a fortieth transistor and a forty-first transistor. A gate and a drain of the fortieth transistor are both connected to the first node, and a source thereof is connected to a drain of the forty-first transistor. A gate of the forty-first transistor is connected to an output end of the next stage of gate driving unit, and a source thereof is connected to the output end of the present stage of gate driving unit.

Compared with the prior art, one embodiment or a plurality of embodiments in the aforesaid technical solutions can have the following advantages or beneficial effects.

According to the present disclosure, the compensation module is provided such that an electric current flowing through a transistor which is connected to the first node is irrelevant to a threshold voltage of the transistor. Therefore, the threshold voltage of the transistor will not influence the electric potential of the first node. According to the present disclosure, the problem of electric current change resulted from forward drift of the threshold voltage can be solved; a stability of the gate driving circuit can be improved to a large extent; and a display effect of a liquid crystal display panel can be improved.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments may be combined together in any manner, and the technical solutions obtained in this manner all fall within the scope of the present disclosure.

In the prior art, a positive bias stress property of IGZO-TFT is not good enough. The prolonged positive bias stress will result in forward drift of a threshold voltage (Vth) of TFT and thus a turning-on speed of IGZO-TFT device becomes slow, which seriously influences a gate driving circuit.

Specifically, the gate driving circuit in the prior art includes multi-stages of gate driving units. Each stage of gate driving unit includes an input control module and a pull-down maintenance module. An output end of the input control module is defined as a first node. The pull-down maintenance module includes a thin film transistor for connecting the first node. However, it is discovered that, the thin film transistor is in a turned-on state in most of time of a scanning period of each frame. That is, there is a positive bias stress always acting on the thin film transistor. As a result, the threshold voltage of the thin film transistor will move rightwards over a long time period. The thin film transistor cannot be turned off rapidly as in a normal condition and thus an electric potential of the first node will be affected.

Figure 1:
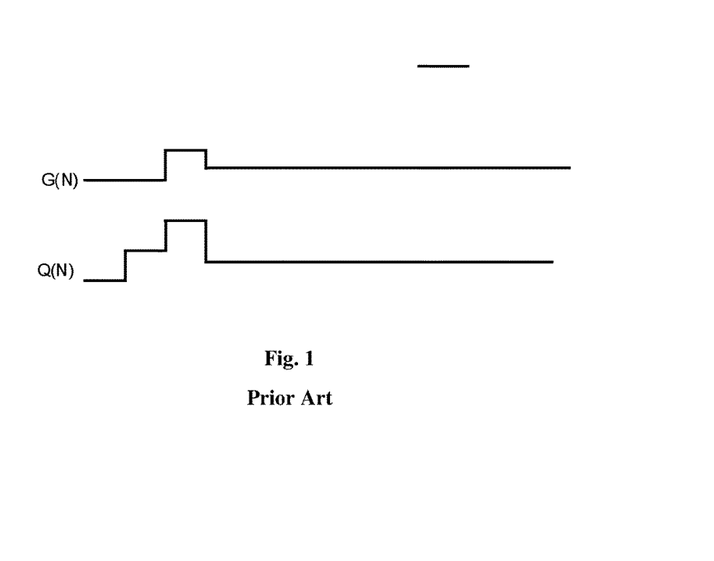
FIG. 1 schematically shows an abnormal electric potential output of a first node and an output end of a gate driving unit caused by drift rightwards of a threshold voltage of a thin film transistor in the prior art.

FIG. 1 schematically shows an abnormal electric potential output of a first node and an output end of a gate driving unit caused by drift rightwards of a threshold voltage of a thin film transistor in the prior art. As shown in FIG. 1, the electric potential of the first node Q(N) is not low enough and thus an electric potential of a GOA unit output end G(N) is not low enough. Therefore, a corresponding active area of the GOA unit is always in a bright state, and a liquid crystal display device cannot work normally.

In order to solve the above technical problem, the embodiment of the present disclosure provides a gate driving circuit.

Figure 2:
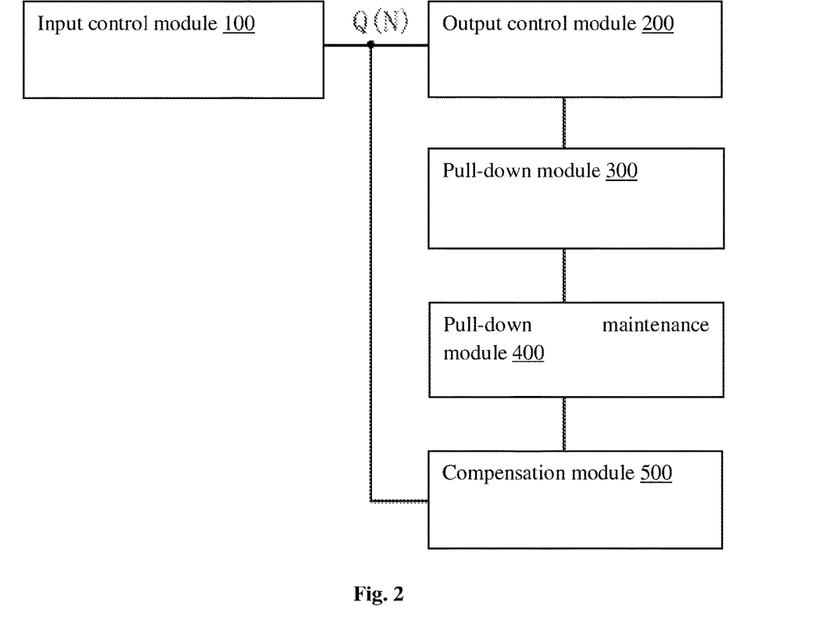
FIG. 2 schematically shows modules of the gate driving unit according to one embodiment of the present disclosure.
Figure 3:
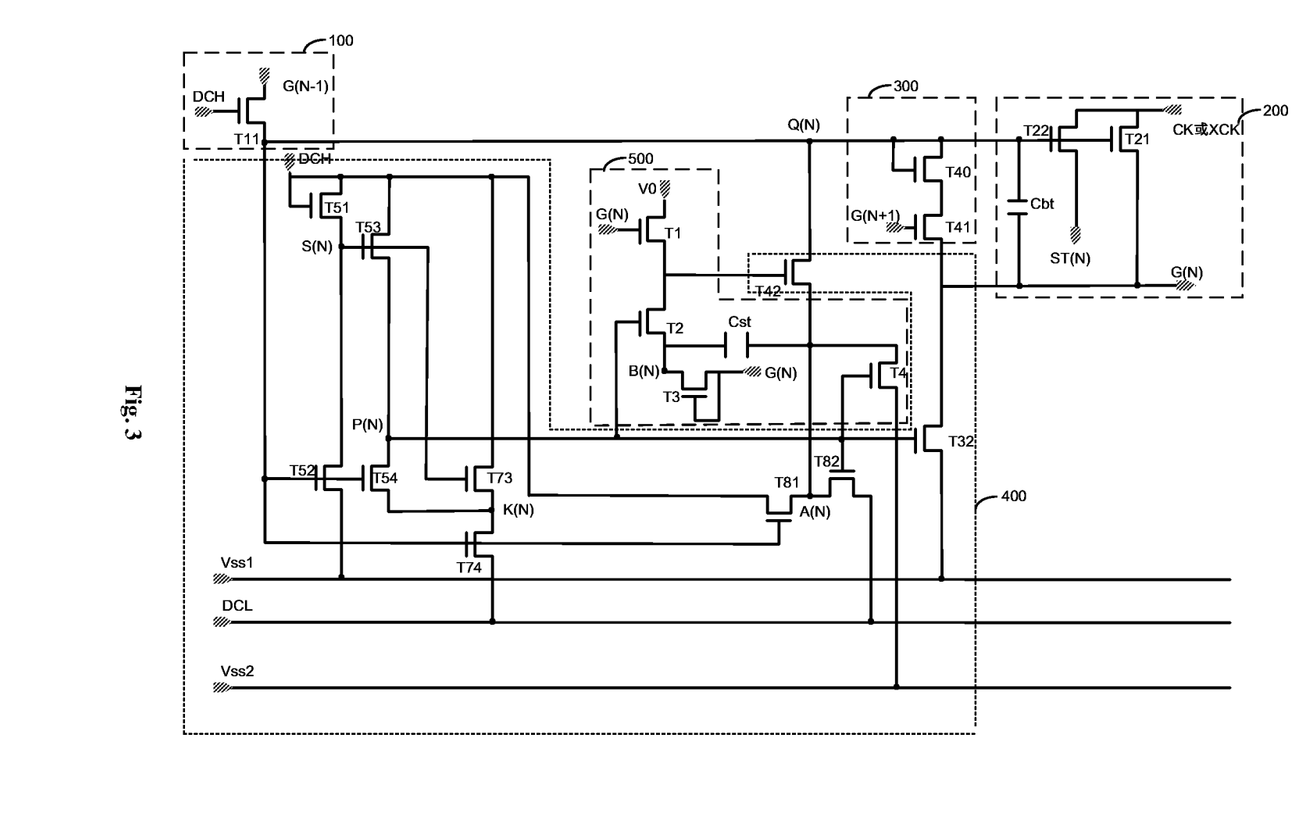
FIG. 3 schematically shows a circuit diagram of the gate driving unit according to the embodiment of the present disclosure.
Figure 4:
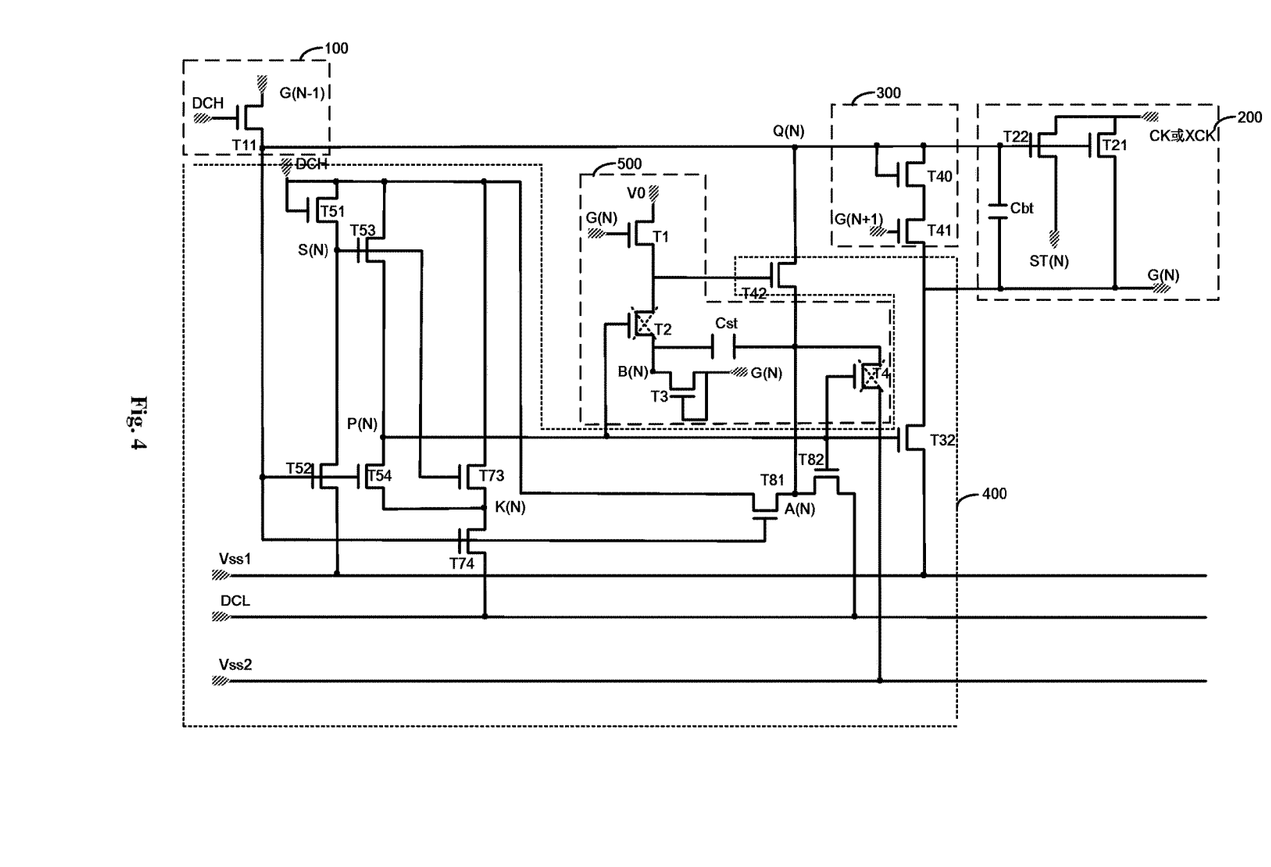
FIG. 4 schematically shows a state of a compensation module as shown in FIG. 3 when the first node outputs a high electric potential.

FIG. 2 schematically shows modules of the gate driving unit according to the present embodiment. FIG. 3 schematically shows a circuit diagram of the gate driving unit according to the present embodiment.

According to the embodiment of the present disclosure, the gate driving circuit comprises multi-stages of gate driving units in series connection with one another. Each stage of gate driving unit is configured to output a scanning signal through an output end thereof according to a scanning signal output by a previous stage of gate driving unit, a scanning signal output by a next stage of gate driving unit, and a clock signal. Circuit structures of the multi-stages of gate driving units comprised in the gate driving circuit are the same as one another.

As shown in FIG. 2, the gate driving unit comprises an input control module 100, an output control module 200, a pull-down module 300, a pull-down maintenance module 400, and a compensation module 500.

The input control module 100 is controlled by a scanning signal G(N−1) output by the previous stage of gate driving unit so as to control an electric potential of a first node Q(N). The output control module 200 is connected to the first node Q(N). The output control module 200 controls an electric potential of an output end G(N) of a present stage of gate driving unit according to the electric potential of the first node Q(N). The pull-down module 300 is connected to the output control module 200. The pull-down module 300 pulls down the electric potential of the output end G(N) of the present stage of gate driving unit according to an electric potential of a second node P(N). The pull-down maintenance module 400 is connected to the pull-down module 300. The pull-down maintenance module 400 maintains the electric potential of the second node P(N) during a non-scanning period so that the electric potential of the output end G(N) of the present stage of gate driving unit is maintained in a negative electric potential. The compensation module 500 is connected to the pull-down maintenance module 400 and the first node Q(N). The compensation module 500 maintains the electric potential of the first node Q(N) in a negative electric potential during the non-scanning period.

Circuit composition of each module and working principle thereof will be illustrated in detail hereinafter with reference to FIG. 3 to FIG. 6.

The input control module 100 comprises an eleventh transistor T11. A gate of the eleventh transistor T11 is connected to a constant high voltage output end DCH, a drain thereof is connected to the output end G(N−1) of the previous stage of gate driving unit, and a source thereof is connected to the first node Q(N).

The output control module 200 comprises a twenty-first transistor T21, a twenty-second transistor T22 and a bootstrap capacitor Cbt. A gate of the twenty-first transistor T21 is connected to the first node Q(N), a drain thereof is connected to an output end CK/XCK of the clock signal, and a source thereof is connected to the output end G(N) of the present stage of gate driving unit. A gate of the twenty-second transistor T22 is connected to the first node Q(N), a drain thereof is connected to the output end CK/XCK of the clock signal, and a source thereof is connected to a driving output end ST(N) of the present stage of gate driving unit. The first node Q(N) is connected to the output end G(N) of the present stage of gate driving unit through the bootstrap capacitor Cbt.

The pull-down module 300 comprises a fortieth transistor T40 and a forty-first transistor T41. A gate and a drain of the fortieth transistor T40 are both connected to the first node Q(N), and a source thereof is connected to a drain of the forty-first transistor T41. A gate of the forty-first transistor T41 is connected to an output end G(N+1) of the next stage of gate driving unit, and a source thereof is connected to the output end G(N) of the present stage of gate driving unit.

The pull-down maintenance module 400 comprises a fifty-first transistor T51, a fifty-second transistor T52, a fifty-third transistor T53, a fifty-fourth transistor T54, a seventy-third transistor T73, a seventy-fourth transistor T74, an eighty-first transistor T81, an eighty-second transistor T82, a forty-second transistor T42, and a thirty-second transistor T32.

A gate and a drain of the fifty-first transistor T51 are both connected to a constant high voltage output end DCH, and a source thereof is connected to a fourth node S(N). A gate of the fifty-second transistor T52 is connected to the first node Q(N), a drain thereof is connected to the fourth node S(N), and a source thereof is connected to a first negative electric potential output end VSS1. A gate of the fifty-third transistor T53 is connected to the fourth node S(N), a drain thereof is connected to the constant high voltage output end DCH, and a source thereof is connected to the second node P(N). A gate of the fifty-fourth transistor T54 is connected to the first node Q(N), a drain thereof is connected to the second node P(N), and a source thereof is connected to a third node K(N) A gate of the seventy-third transistor T73 is connected to the fourth node S(N), a drain thereof is connected to the constant high voltage output end DCH, and a source thereof is connected to the third node K(N). A gate of the seventy-fourth transistor T74 is connected to the first node Q(N), a drain thereof is connected to the third node S(N), and a source thereof is connected to a constant low voltage output end DCL. A gate of the eighty-first transistor T81 is connected to the first node Q(N), a drain thereof is connected to the constant high voltage output end DCH, and a source thereof is connected to a fifth node A(N). A gate of the eighty-second transistor T82 is connected to the second node P(N), a drain thereof is connected to the constant low voltage output end DCL, and a source thereof is connected to the fifth node A(N). A gate of the forty-second transistor T42 is connected to the compensation module 500, a drain thereof is connected to the first node Q(N), and a source thereof is connected to the fifth node A(N). A gate of the thirty-second transistor T32 is connected to the second node P(N), a drain thereof is connected to the output end G(N) of the present stage of gate driving unit, and a source thereof is connected to the first negative electric potential output end VSS1.

Figure 6:
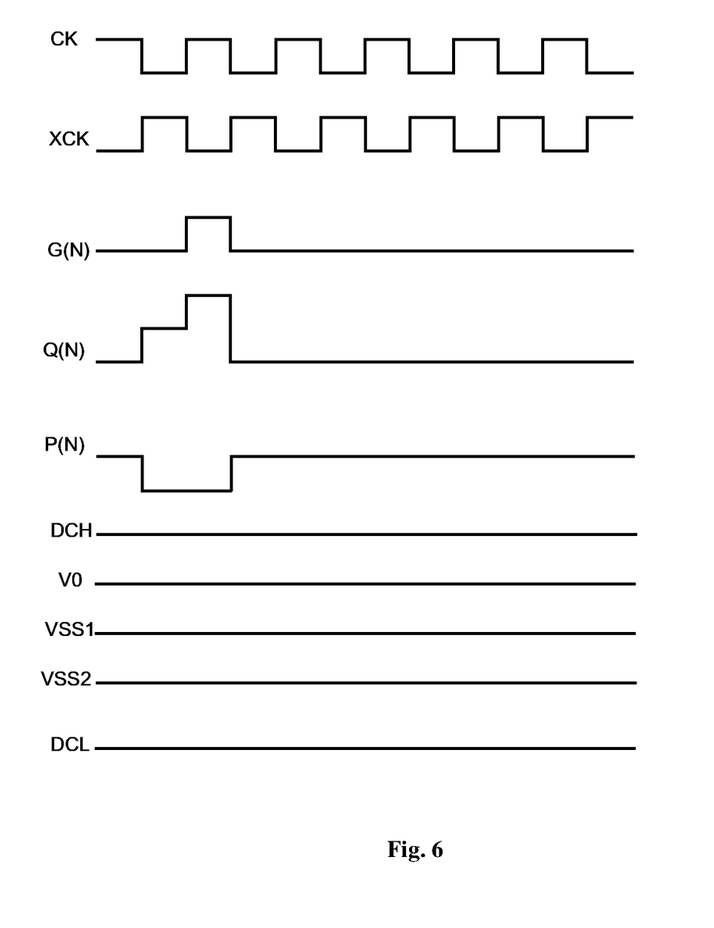
FIG. 6 schematically shows waveform arrangements and output waveforms of key nodes in the gate driving unit according to the embodiment of the present disclosure.

Here, it should be noted that, the electric potential of the constant low voltage output end DCL, the electric potential of the first negative electric potential output end VSS1, and an electric potential of the second negative electric potential output end VSS2 increase in sequence. The electric potential of the constant high voltage output end DCH is higher than an electric potential of the positive electric potential output end V0. According to one preferable embodiment of the present disclosure, an electric potential of the constant high voltage output end DCH is in a range from 20- to 30V. The electric potential of the constant low voltage output end DCL and the electric potential of the first negative electric potential output end VSS1 are both in a range from −5 to −8V. The electric potential of the positive electric potential output end is in a range from 2 to 5V. CK and XCK as shown in FIG. 6 are clock signals with opposite phases.

The pull-down maintenance module 400 adopts a special double inverters design, wherein the fifty-first transistor T51, the fifty-second transistor T52, the fifty-third transistor T53 and the fifty-fourth transistor T54 constitute a major inverter, and the seventy-third transistor T73 and the seventy-fourth transistor T74 constitute an auxiliary inverter. The major inverter plays a role of controlling the thirty-second transistor T32 and the forty-second transistor T42. The auxiliary inverter plays a role of providing a low electric potential for the major inverter during a functioning period, and providing a suitable high electric potential for the major inverter during a non-functioning period to reduce an electric leakage of the fifty-fourth transistor T54 so as to ensure that the major inverter can produce a relatively high electric potential during the non-functioning period. The auxiliary inverter controls the seventy-third transistor T73 through the fourth node S(N) of the major inverter, whereby an element number of the auxiliary inverter can be reduced. That is, no additional element needs to be provided therein to produce a waveform similar to that of the fourth node S(N) so as to control the seventy-third transistor T73.

During the functioning period, after the auxiliary inverter is driven by a high voltage of the fourth node S(N) and a low voltage of the constant low voltage output end DCL, the fifty-second transistor T52 is pulled down to the electric potential of the first negative electric potential output end VSS1, and the seventy-fourth transistor T74 is turned on when the first node Q(N) is in a high voltage and is pulled down to a voltage of the constant high voltage output end DCH. Accordingly, the third node K(N) is in a much lower electric potential and the second node P(N) is also pulled down to a much lower electric potential. That is, the auxiliary inverter provides a low electric potential for the major inverter during the functioning period. Hence, electric leakage, which is caused by a physical property that the thirty-second transistor T32 and the forty-second transistor T42 have a lower threshold voltage or their threshold voltage approaches 0V, can be prevented, and it can be ensured that the pull-down maintenance module 400 can be pulled down normally during the functioning period.

During the non-functioning period, the fifty-second transistor T52, the fifty-fourth transistor T54 and the seventy-fourth transistor T74 are all turned off. Since the gate of the fifty-fourth transistor T54 is connected to the first node Q(N) and the source thereof is connected to the third node K(N), the gate of the fifty-fourth transistor T54 is in a negative electric potential and the source thereof is in a positive electric potential. Hence, a voltage difference between the gate and the source of the fifty-fourth transistor T54 is a negative value with a relatively large absolute value, and thus the fifty-fourth transistor T54 can be turned off very well and its electric leakage can be reduced. That is, the auxiliary inverter provides a suitable high electric potential for the major inverter during the non-functioning period to reduce the electric leakage of the fifty-fourth transistor T54. In this manner, it can be ensured that the pull-down maintenance module 400 is in a relatively high electric potential during the non-functioning period, and the first node Q(N) and the output end G(N) can be maintained in a low electric potential. Moreover, when the third node K(N) is in the high electric potential, it also plays a role of voltage sharing, which can help to drive the electric potential of the second node P(N) to be higher, and thus the electric potential of the second node P(N) can be further stabilized.

The compensation module 500 comprises a first transistor T1, a second transistor T2, a third transistor T3, a fourth transistor T4, and a storage capacitor Cst. A gate of the first transistor T1 is connected to the output end G(N) of the present stage of gate driving unit, a drain thereof is connected to the positive electric potential output end DCH, and a source thereof is connected to the gate of the forty-second transistor T42. A gate of the second transistor T2 is connected to the second node P(N), a drain thereof is connected to the gate of the forty-second transistor T42, and a source thereof is connected to a sixth node B(N). A gate and a source of the third transistor T3 are connected to the output end G(N) of the present stage of gate driving unit, and a drain thereof is connected to the sixth node B(N). A gate of the fourth transistor T4 is connected to the second node P(N), a drain thereof is connected to the sixth node B(N) through the storage capacitor Cst, and a source thereof is connected to a second negative electric potential output end VSS2.

In the following part, a function of the compensation module 500 will be specifically illustrated with reference to FIGS. 5 and 6.

According to the present embodiment, in order to solve the problem of the forward drift of the threshold voltage Vth easily occurred in the forty-second transistor T42, a module for compensating the forward drift of the threshold voltage Vth of the forty-second transistor T42 is provided. By using this compensation module, an influence of the threshold voltage Vth can be ignored and a stability of the forty-second transistor T42 can be improved.

Figure 5:
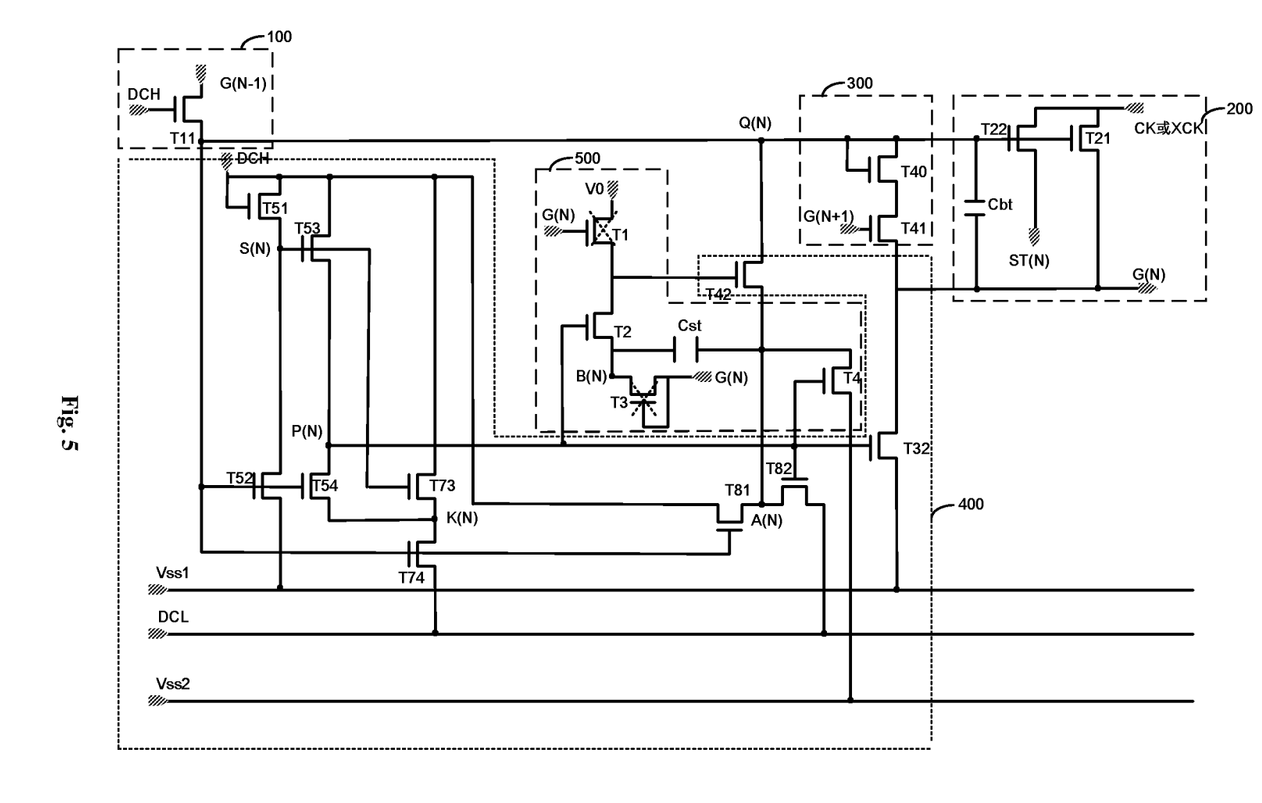
FIG. 5 schematically shows a state of the compensation module as shown in FIG. 3 when the second node outputs a high electric potential.

As shown in FIG. 5, when the output end G(N) of the present stage of gate driving unit is in a high electric potential, the forty-first transistor T41 and the forty-third transistor T43 are both turned on, while the forty-second transistor T42 and the forty-fourth transistor T44 are both turned off. It can be seen that, an electric potential of a source side (i.e., one side of the storage capacitor Cst for connecting the source of the forty-second transistor T42) of the forty-second transistor T42 is V0−Vth. An electric potential of the other side of the storage capacitor Cst is GH. Therefore, it can be obtained that, a voltage difference between two plates of the storage capacitor Cst is GH−V0+Vth.

As shown in FIG. 6, when the second node P(N) is in a high electric potential, the forty-second transistor T42 and the forty-fourth transistor T44 are both turned on, while the forty-first transistor T41 and the forty-third transistor T43 are both turned off. An electric current flowing through the forty-second transistor T42 is shown by a following formula.

$$Id=\frac{1}{2}\beta[(Vg-Vs)-Vth]Vds=\frac{1}{2}\beta[(GH-V0+Vth)-Vth]Vds=\frac{1}{2}\beta[(GH-V0)]Vds$$

It can be seen that, the electric current flowing through the forty-second transistor T42 is irrelevant to the threshold voltage Vth. That is, when the compensation module 500 disclosed herein is used, no matter the forward drift occurs to the threshold voltage Vth of the forty-second transistor T42 or not, such threshold voltage Vth will not influence the electric potential of the first node Q(N). Therefore, the compensation module 500 according to the present embodiment can effectively solve the problem of electric current change resulted from the forward drift of the threshold voltage.

According to the present embodiment, the compensation module 500 is provided such that an electric current flowing through a transistor which is connected to the first node Q(N) is irrelevant to a threshold voltage of the transistor. Therefore, the threshold voltage of the transistor will not influence the electric potential of the first node Q(N). According to the present embodiment, the problem of electric current change resulted from forward drift of the threshold voltage can be solved; a stability of the gate driving circuit can be improved to a large extent; and a display effect of a liquid crystal display panel can be improved.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A gate driving circuit, comprising multi-stages of gate driving units in series connection with one another,
   wherein each stage of gate driving unit is configured to output a scanning signal through an output end thereof according to a scanning signal output by a previous stage of gate driving unit, a scanning signal output by a next stage of gate driving unit, and a clock signal; and
   wherein each stage of gate driving unit comprises:
   an input control module, configured to be controlled by the scanning signal output by the previous stage of gate driving unit so as to control an electric potential of a first node;
   an output control module, connected to the first node, and configured to control an electric potential of an output end of a present stage of gate driving unit according to the electric potential of the first node;
   a pull-down module, connected to the output control module, and configured to pull down the electric potential of the output end of the present stage of gate driving unit according to an electric potential of a second node;
   a pull-down maintenance module, connected to the pull-down module, and configured to maintain the electric potential of the second node during a non-scanning period so that the electric potential of the output end of the present stage of gate driving unit is maintained in a negative electric potential; and
   a compensation module, connected to the pull-down maintenance module and the first node, and configured to maintain the electric potential of the first node in a negative electric potential during the non-scanning period.

2. The gate driving circuit according to claim 1, wherein the input control module comprises an eleventh transistor; and
   wherein a gate of the eleventh transistor is connected to a constant high voltage output end, a drain thereof is connected to the output end of the previous stage of gate driving unit, and a source thereof is connected to the first node.

3. The gate driving circuit according to claim 2, wherein the output control module comprises:
   a twenty-first transistor, with a gate thereof being connected to the first node, a drain thereof being connected to an output end of the clock signal, and a source thereof being connected to the output end of the present stage of gate driving unit;
   a twenty-second transistor, with a gate thereof being connected to the first node, a drain thereof being connected to the output end of the clock signal, and a source thereof being connected to a driving output end of the present stage of gate driving unit; and
   a bootstrap capacitor, wherein the first node is connected to the output end of the present stage of gate driving unit through the bootstrap capacitor.

4. The gate driving circuit according to claim 3, wherein the pull-down module comprises a fortieth transistor and a forty-first transistor,
   wherein a gate and a drain of the fortieth transistor are both connected to the first node, and a source thereof is connected to a drain of the forty-first transistor; and
   wherein a gate of the forty-first transistor is connected to an output end of the next stage of gate driving unit, and a source thereof is connected to the output end of the present stage of gate driving unit.

5. The gate driving circuit according to claim 1, wherein the pull-down maintenance module comprises:
   a fifty-first transistor, with a gate and a drain thereof both being connected to a constant high voltage output end, and a source thereof being connected to a fourth node;
   a fifty-second transistor, with a gate thereof being connected to the first node, a drain thereof being connected to the fourth node, and a source thereof being connected to a first negative electric potential output end;
   a fifty-third transistor, with a gate thereof being connected to the fourth node, a drain thereof being connected to the constant high voltage output end, and a source thereof being connected to the second node;
   a fifty-fourth transistor, with a gate thereof being connected to the first node, a drain thereof being connected to the second node, and a source thereof being connected to a third node;
   a seventy-third transistor, with a gate thereof being connected to the fourth node, a drain thereof being connected to the constant high voltage output end, and a source thereof being connected to the third node;
   a seventy-fourth transistor, with a gate thereof being connected to the first node, a drain thereof being connected to the third node, and a source thereof being connected to a constant low voltage output end;
   an eighty-first transistor, with a gate thereof being connected to the first node, a drain thereof being connected to the constant high voltage output end, and a source thereof being connected to a fifth node;
   an eighty-second transistor, with a gate thereof being connected to the second node, a drain thereof being connected to the constant low voltage output end, and a source thereof being connected to the fifth node;

a forty-second transistor, with a gate thereof being connected to the compensation module, a drain thereof being connected to the first node, and a source thereof being connected to the fifth node; and a thirty-second transistor, with a gate thereof being connected to the second node, a drain thereof being connected to the output end of the present stage of gate driving unit, and a source thereof being connected to the first negative electric potential output end, wherein an electric potential of the constant low voltage output end is lower than an electric potential of the first negative electric potential output end.

6. The gate driving circuit according to claim 5, wherein the input control module comprises an eleventh transistor; and wherein a gate of the eleventh transistor is connected to the constant high voltage output end, a drain thereof is connected to the output end of the previous stage of gate driving unit, and a source thereof is connected to the first node.

7. The gate driving circuit according to claim 6, wherein the output control module comprises:

a twenty-first transistor, with a gate thereof being connected to the first node, a drain thereof being connected to an output end of the clock signal, and a source thereof being connected to the output end of the present stage of gate driving unit;

a twenty-second transistor, with a gate thereof being connected to the first node, a drain thereof being connected to the output end of the clock signal, and a source thereof being connected to a driving output end of the present stage of gate driving unit; and a bootstrap capacitor, wherein the first node is connected to the output end of the present stage of gate driving unit through the bootstrap capacitor.

8. The gate driving circuit according to claim 7, wherein the pull-down module comprises a fortieth transistor and a forty-first transistor, wherein a gate and a drain of the fortieth transistor are both connected to the first node, and a source thereof is connected to a drain of the forty-first transistor; and wherein a gate of the forty-first transistor is connected to an output end of the next stage of gate driving unit, and a source thereof is connected to the output end of the present stage of gate driving unit.

9. The gate driving circuit according to claim 5, wherein an electric potential of the constant high voltage output end is in a range from 20 to 30V; and wherein the electric potential of the constant low voltage output end and the electric potential of the first negative electric potential output end are both in a range from −5 to −8V.

10. The gate driving circuit according to claim 9, wherein the input control module comprises an eleventh transistor; and wherein a gate of the eleventh transistor is connected to the constant high voltage output end, a drain thereof is connected to the output end of the previous stage of gate driving unit, and a source thereof is connected to the first node.

11. The gate driving circuit according to claim 10, wherein the output control module comprises:

a twenty-first transistor, with a gate thereof being connected to the first node, a drain thereof being connected to an output end of the clock signal, and a source thereof being connected to the output end of the present stage of gate driving unit;

a twenty-second transistor, with a gate thereof being connected to the first node, a drain thereof being connected to the output end of the clock signal, and a source thereof being connected to a driving output end of the present stage of gate driving unit; and a bootstrap capacitor, wherein the first node is connected to the output end of the present stage of gate driving unit through the bootstrap capacitor.

12. The gate driving circuit according to claim 11, wherein the pull-down module comprises a fortieth transistor and a forty-first transistor, wherein a gate and a drain of the fortieth transistor are both connected to the first node, and a source thereof is connected to a drain of the forty-first transistor; and wherein a gate of the forty-first transistor is connected to an output end of the next stage of gate driving unit, and a source thereof is connected to the output end of the present stage of gate driving unit.

13. The gate driving circuit according to claim 5, wherein the compensation module comprises:

a first transistor, with a gate thereof being connected to the output end of the present stage of gate driving unit, a drain thereof being connected to an output end of a positive electric potential, and a source thereof being connected to the gate of the forty-second transistor;

a second transistor, with a gate thereof being connected to the second node, a drain thereof being connected to the gate of the forty-second transistor, and a source thereof being connected to the sixth node;

a third transistor, with a gate and a source thereof being connected to the output end of the present stage of gate driving unit, and a drain thereof being connected to the sixth node;

a storage capacitor; and a fourth transistor, with a gate thereof being connected to the second node, a drain thereof being connected to the sixth node through the storage capacitor, and a source thereof being connected to a second negative electric potential output end, wherein the electric potential of the constant low voltage output end, the electric potential of the first negative electric potential output end, and an electric potential of the second negative electric potential output end increase in sequence; and wherein the electric potential of the constant high voltage output end is higher than an electric potential of the positive electric potential output end.

14. The gate driving circuit according to claim 13, wherein the input control module comprises an eleventh transistor; and wherein a gate of the eleventh transistor is connected to the constant high voltage output end, a drain thereof is connected to the output end of the previous stage of gate driving unit, and a source thereof is connected to the first node.

15. The gate driving circuit according to claim 14, wherein the output control module comprises:

a twenty-first transistor, with a gate thereof being connected to the first node, a drain thereof being connected to an output end of the clock signal, and a source thereof being connected to the output end of the present stage of gate driving unit;

a twenty-second transistor, with a gate thereof being connected to the first node, a drain thereof being connected to the output end of the clock signal, and a source thereof being connected to a driving output end of the present stage of gate driving unit; and a bootstrap capacitor, wherein the first node is connected to the output end of the present stage of gate driving unit through the bootstrap capacitor.

16. The gate driving circuit according to claim 15, wherein the pull-down module comprises a fortieth transistor and a forty-first transistor, wherein a gate and a drain of the fortieth transistor are both connected to the first node, and a source thereof is connected to a drain of the forty-first transistor; and wherein a gate of the forty-first transistor is connected to an output end of the next stage of gate driving unit, and a source thereof is connected to the output end of the present stage of gate driving unit.

17. The gate driving circuit according to claim 13, wherein the electric potential of the positive electric potential output end is in a range from 2 to 5V.

18. The gate driving circuit according to claim 17, wherein the input control module comprises an eleventh transistor; and wherein a gate of the eleventh transistor is connected to the constant high voltage output end, a drain thereof is connected to the output end of the previous stage of gate driving unit, and a source thereof is connected to the first node.

19. The gate driving circuit according to claim 18, wherein the output control module comprises:

a twenty-first transistor, with a gate thereof being connected to the first node, a drain thereof being connected to an output end of the clock signal, and a source thereof being connected to the output end of the present stage of gate driving unit;

a twenty-second transistor, with a gate thereof being connected to the first node, a drain thereof being connected to the output end of the clock signal, and a source thereof being connected to a driving output end of the present stage of gate driving unit; and a bootstrap capacitor, wherein the first node is connected to the output end of the present stage of gate driving unit through the bootstrap capacitor.

20. The gate driving circuit according to claim 19, wherein the pull-down module comprises a fortieth transistor and a forty-first transistor, wherein a gate and a drain of the fortieth transistor are both connected to the first node, and a source thereof is connected to a drain of the forty-first transistor; and wherein a gate of the forty-first transistor is connected to an output end of the next stage of gate driving unit, and a source thereof is connected to the output end of the present stage of gate driving unit.

* * * * *